United States Patent
Kawaguchi et al.

[11] Patent Number: 6,016,164
[45] Date of Patent: Jan. 18, 2000

[54] IMAGE SIGNAL INTERPOLATING APPARATUS

[75] Inventors: Kunio Kawaguchi; Tetsujiro Kondo, both of Kanagawa, Japan

[73] Assignee: Sony Corporation, Tokyo, Japan

[21] Appl. No.: 09/200,249

[22] Filed: Nov. 25, 1998

Related U.S. Application Data

[63] Continuation of application No. 08/562,429, Nov. 24, 1995.

[30] Foreign Application Priority Data

Nov. 28, 1994 [JP] Japan .................................. 6-319054

[51] Int. Cl.$^7$ ....................................................... H04N 7/18
[52] U.S. Cl. ........................... 348/424; 348/420; 348/421; 348/445; 382/41; 382/45; 382/46; 358/455; 358/456
[58] Field of Search ..................................... 348/420, 421, 348/424, 423, 699, 701, 702, 700, 445, 449, 575, 581; 382/41, 43, 45, 46, 49; 358/455, 456

[56] References Cited

U.S. PATENT DOCUMENTS

| | | |
|---|---|---|
| 4,858,013 | 8/1989 | Matsuda ..................................... 358/13 |
| 5,032,910 | 7/1991 | Cok ............................................ 358/13 |
| 5,131,057 | 7/1992 | Walowit et al. ........................... 382/41 |
| 5,184,218 | 2/1993 | Gerdes ..................................... 358/133 |
| 5,363,213 | 11/1994 | Coward et al. ........................... 358/455 |
| 5,517,245 | 5/1996 | Kondo et al. ............................. 348/392 |

*Primary Examiner*—Tommy P. Chin
*Assistant Examiner*—Anand S. Rao
*Attorney, Agent, or Firm*—Frommer Lawrence & Haug, LLP.; William S. Frommer

[57] ABSTRACT

An image signal interpolating apparatus with a simple structure which generates an interpolation picture element value near the real value without aliasing noise is realized. Predictive coefficients D8 which correspond to the class are read-out, and interpolation data D2 are obtained based on the predictive coefficients D8, thereby, interpolation data D2 near the real value are obtained without aliasing noise. In addition, the flatness near an interpolation-addressed picture element is detected and picture elements used for classification are selected depending on the resultant detected flatness D4, thereby, the interpolation-addressed picture element is classified correctly with the least number of class. Thus the structure can be simplified.

6 Claims, 6 Drawing Sheets

○ SAMPLING PICTURE ELEMENT
✕ ╳ SUBSAMPLING PICTURE ELEMENT
╳ PICTURE ELEMENT TO BE INTERPOLATED

F I G. 4A
F I G. 4B
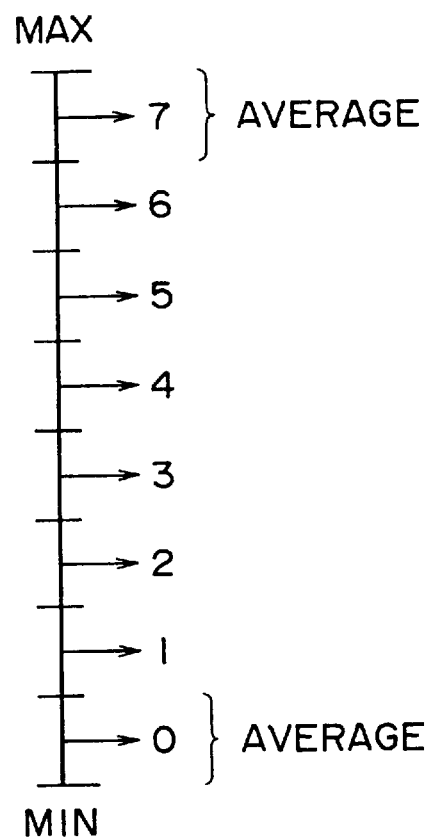
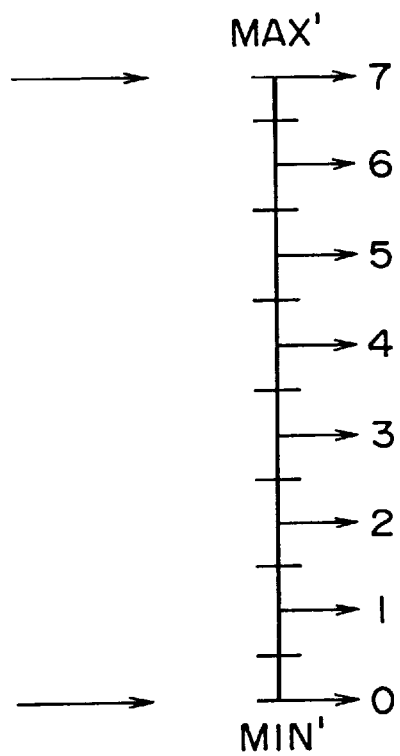

○ SAMPLING PICTURE ELEMENT
× SUBSAMPLING PICTURE ELEMENT

○ SAMPLING PICTURE ELEMENT
× INTERPOLATED PICTURE ELEMENT

IMAGE SIGNAL INTERPOLATING APPARATUS

This application is a continuation of Ser. No. 08/562,429, filed Nov. 24, 1995.

BACKGROUND OF THE INVENTION

1. Field of the Invention

This invention relates to an image signal interpolating apparatus, and more particularly to an image signal interpolating apparatus preferably applied to improve the resolution of an image by interpolating picture elements which had thinned out by subsampling.

2. Description of Related Art.

Conventionally, as the method for band compression or information reduction when image signals are recorded or transmitted, methods of thinning out picture elements of an original image at a certain interval have been widely used. As an example of such method, multiple sub-nyquist sampling encoding has been known.

As an example of subsampling, offset subsampling has been well known. In the two dimensional offset subsampling of shown in FIG. 6, sampling interval (Tx, Ty) in the horizontal direction (x-direction) and vertical direction (y-direction) is set to be double a picture element interval (Hx, Hy) of each original signal, and subsampling (X) proceeds alternately. In the case of offset subsampling, sampling points (O) which are positioned adjacent vertically are offset each other by a half sampling interval (Tx/2). As the result, the space frequency component in horizontal and vertical directions of the transmission band of the image signal after offset subsampling is widened to the space frequency in slant direction as shown in FIG. 7, and consequently thin-off processing is possible without remarkable visual picture deterioration.

When the offset subsampled image signal is displayed on a monitor or printed out, as shown in FIG. 8, picture elements between each sampling point must be interpolated with adjacent picture elements. Such interpolation processing allows frequency component in the slant area shown in FIG. 7 to pass, and prevent the frequency component in area which contains loopback point A from passing and functions as a space filter, thus this interpolation processing is recognized as a back-end filter in the sampling theory.

Offset subsampling is very effective method when a front-end filter is correctly used, but when a front-end filter is not sufficient because of, for example, constraint due to hardware or a front-end filter is not sufficient because widening of the transmission band, the deterioration of image due to aliasing noise is a problem.

As a method to reduce the aliasing noise, adaptive interpolation has been proposed. In this method, when subsampled image signal is interpolated, closely correlated direction is detected around a picture element to be interpolated, and depending on the detected result a plurality of different interpolation means are selectively used for interpolation.

In the adaptive interpolation, the interpolation accuracy depends seriously on the accuracy of direction detection of closely correlated direction and performance of interpolation means. Therefore, when the performance of individual interpolation means is insufficient for proper interpolation, or closely correlated direction is erroneously judged, not only the original signal component decreases but also aliasing noise increases. These disadvantages are serious problem of this adaptive interpolation.

SUMMARY OF THE INVENTION

The present invention is accomplished to solve these problems, and the present invention provides an image signal interpolation apparatus having a simple structure for determining an interpolation picture element value near the real value without aliasing noise.

To solve these problems, an image signal interpolating apparatus (1) of the present invention for receiving thinned-out transmission image data (D1) and interpolating the thinned-out picture element comprises; flatness detecting means (3) for detecting the flatness near an interpolation-addressed picture element using picture elements (a to d) near the interpolation-addressed picture element (X symbol in FIG. 2), picture element selecting means (4) for selecting a surrounding picture elements (a to d, or a to l) from surrounding picture elements (a to l) depending on the resultant detected flatness (D4) obtained by the flatness detecting means (3), classifying means (5 and 6) for classifying the interpolation-addressed picture element depending on the level distribution pattern of the surrounding picture elements (a to d or a to l) selected by the picture element selecting means (4), predictive coefficient generating means (7) for generating a predictive coefficients (D8) corresponding to the class classified by the classifying means (5 and 6), interpolation data calculating means (8) for calculating interpolation data (D2) corresponding to the interpolation-addressed picture element by predictive operation using the predictive coefficient (D8) and transmission image data (D1).

In the present invention, the picture element selecting means (4) selects the first number of surrounding picture elements (a to d) when the resultant detected flatness (D4) suggests the small flatness, and selects the second number (more than the first number) of surrounding picture element (a to l) when the resultant detected flatness (D4) suggests the large flatness, while, the classifying means comprising data compressing means compresses the selected surrounding picture elements (a to d) at the first compression ratio when the resultant detected flatness (D4) suggests a small flatness, and compresses the selected surrounding picture elements (a to l) at the second compression ratio (larger than the first compression ratio) when the resultant detected flatness (D4) suggests a large flatness.

The interpolation data (D2) are obtained using predictive coefficients (D8) which correspond to the class so as to obtain near the real interpolation data (D2) without aliasing noise. In addition, the detection of flatness near an interpolation-addressed picture element and selection of picture elements to be used for classification depending on the detection result (D4) favors the correct classification of an interpolation-addressed picture element with the least number of class. This mechanism allows the structure of predictive coefficient generating means to be simple.

BRIEF DESCRIPTION OF THE DRAWINGS

FIGS. 4A and 4B are schematic diagram for illustrating bit compression by the ADRC circuit.

DETAILED DESCRIPTION OF THE PREFERRED EMBODIMENT

One embodiment of the present invention will be described in detail referring to the attached drawings.

(1) Whole structure

Figure 1:
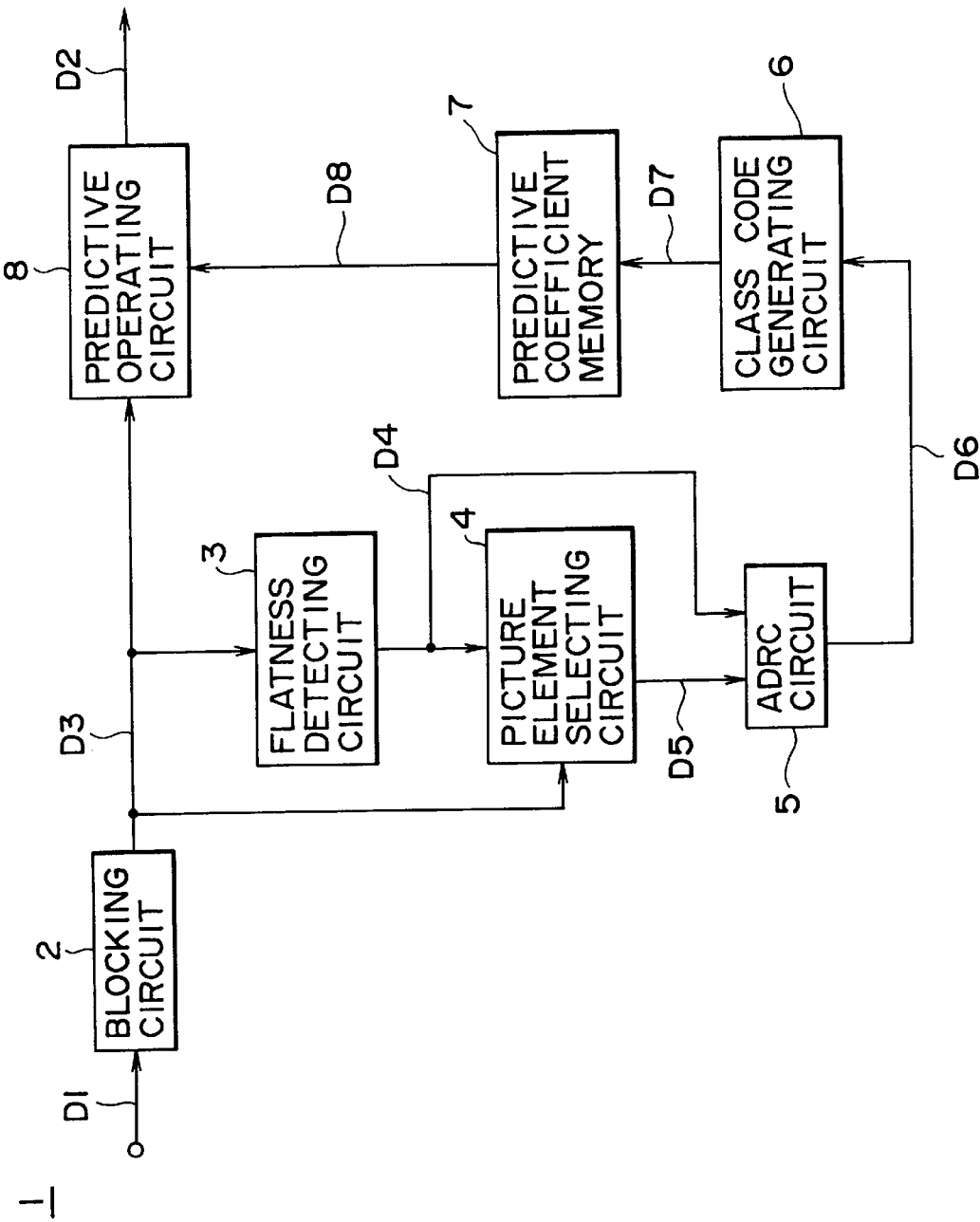
FIG. 1 is a block diagram for illustrating the structure of a embodiment of an image signal interpolating apparatus in accordance with the present invention.

In FIG. 1, 1 represents the whole image signal interpolating apparatus, input image data (D1), the information content of which original data is reduced by offset subsampling, are subjected to an adaptive interpolation processing through classification to generate near real interpolation data (D2).

In detail, the image signal interpolating apparatus 1 classifies an interpolation-addressed picture element (namely thinned-out picture element) depending on the level distribution pattern of sampling picture elements around the interpolation-addressed picture element (namely picture elements included in the input image data D1), reads predictive coefficients previously obtained by learning for each class, and obtains interpolation picture element values using the predictive coefficients.

Thereby, in the image signal interpolating apparatus 1, a picture element value which is significantly nearer to the real value is obtained comparing with the conventional apparatus in which an interpolation-addressed picture element is obtained using merely average interpolation of the surrounding sampling picture elements.

Figure 2:
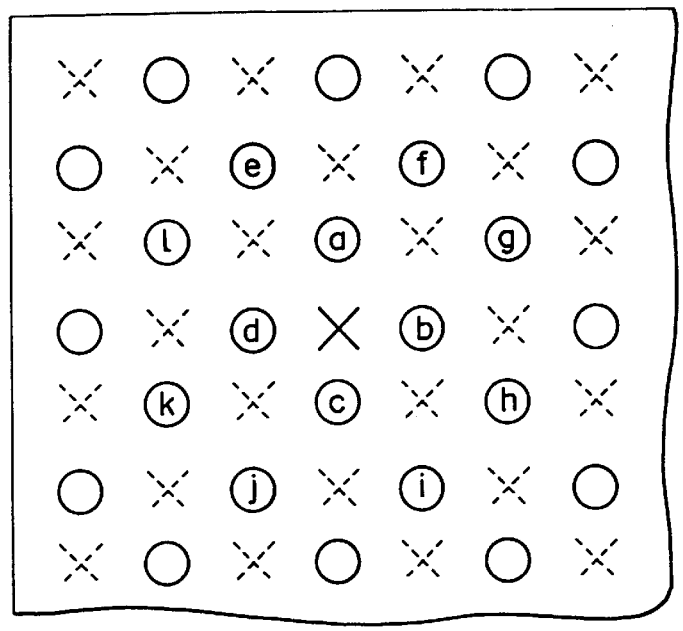
FIG. 2 is a schematic diagram for illustrating surrounding picture elements used for classifying in the embodiment.

The image signal interpolating apparatus 1 is fed with an input image data D1 at the blocking circuit 2, and in the blocking circuit 2 the input image data D1 is divided to blocks of a prescribed size. Practically, the blocking circuit 2 generates unit blocks, each unit block comprises twelve surrounding picture elements a to l around the interpolation-addressed picture element (X symbol) as shown in FIG. 2.

The flatness detecting circuit 3 is fed with the blocked image data D3, and detects the local flatness in the area which includes the interpolation-addressed picture element in a block. In detail, the flatness detecting circuit 3 detects the flatness using the four surrounding picture elements a to d adjacent to the interpolation-addressed picture element (X symbol).

If the flatness of the surrounding picture elements a to d is small, the flatness detecting circuit 3 judges the class of interpolation-addressed picture element (X symbol) to be sufficiently estimated with only the four picture elements a to d, and sends a flatness detection signal D4 which implies the judgment to the subsequent picture element selecting circuit 4. On the other hand, if the flatness of the surrounding picture elements is large, the flatness detecting circuit 3 judges the class of interpolation-addressed picture element can not to be estimated with only the four picture elements a to d, and sends a flatness detection signal D4 which implies the judgment of impossibility to the subsequent picture element selecting circuit 4. In this connection, for the flatness detecting circuit 3 of the embodiment, when the difference between the maximum value and the minimum value in picture element values of the four picture elements a to d exceeds 20, the flatness is referred as the small, and when the difference is 20 or less the flatness is referred as the large.

When the flatness is judged to be small based on the flatness detection signal D4, the picture element selecting circuit 4 sends only the picture element data of the four picture elements a to d out of in-block picture elements a to l as the selected picture element data D5 to the ADRC (adaptive dynamic range coding) circuit 5. On the other hand, when the flatness is judged to be large, the picture element selecting circuit 4 sends the picture element data of the total nine surrounding picture elements e to l in addition to the average value M of the four picture elements a to d as selected picture element data D5 to the ADRC circuit 5.

The ADRC circuit 4 receives the selected picture element data D5 from the picture element selecting circuit 4, and the selected picture element data D5 is subjected to adaptive dynamic range coding to bit-compress each picture element value, thereby pattern compression data D6 are formed.

As described hereinbefore, the image signal interpolation apparatus is structured so that all surrounding picture elements a to d divided by the blocking circuit 2 are not always used for classification, but the number of picture element used for classification is properly selected depending on the local flatness of the surrounding picture elements a to d, and thus the number of class is effectively reduced.

As the result, if the subsequent ADRC circuit 5 is structured, for example, for one bit adaptive quantizing, the surrounding condition of interpolation-addressed picture element is expressed with $2^4$ patterns for small flatness, and $2^9$ patterns for large flatness. Therefore, it is easily understood that, comparing with $2^{12}$ patterns for the case in which all surrounding twelve picture elements are used, in this method the interpolation-addressed picture element is expressed with significantly reduced patterns.

In addition, the ADRC circuit 5 is structured so as to switch the bit compression ratio based on the flatness detection signal D4 from the flatness detecting circuit 3. In detail, when receiving resultant detected flatness signal 4 which suggests the small flatness the ADRC circuit 5 compresses each picture element value of the four picture elements a to d from 8 bit per one picture element to 2 bit per one picture element. On the other hand, when receiving resultant detected flatness signal 4 which suggests the large flatness the ADRC circuit 5 compresses the average picture element value M and the surrounding eight picture elements e to l, total nine picture elements, to one bit per one picture element. Therefore, the condition of surrounding picture elements is represented with $4^4$ patterns when the flatness is small, and with $2^9$ patterns when the flatness is large. Thereby, ADRC circuit 5 is possible to compress efficiently without loosing feature quantity of surrounding picture elements.

The pattern compression data D6 are fed to the class code generating circuit 6. The class code generating circuit 6 generates a class code D6 based on the pattern compression data D7, and fed it to the predictive coefficient memory 7. The predictive coefficient memory 7 reads the class code D6 and gives predictive coefficients D8 previously obtained by learning as described hereinafter for each class and stored as address.

The predictive operation circuit 8 calculates the picture element value of the interpolation-addressed picture element by operation based on the linear combination equation using picture element values a to l included in the blocked image data D3 and the predictive coefficients D8, and generates output of the picture element value as interpolation data D2.

As described herein above, the image signal interpolating apparatus 1 is structured so as to form interpolation element using the predictive coefficients previously obtained by learning and thereby the interpolation picture element value near the real value can be obtained. The image signal interpolating apparatus 1 is structured so as to select picture elements used for classification and so as to change the compression ratio when classifying depending on the flatness, thereby the efficiency of classification is significantly improved. As the result, the number of class is reduced, and the structure of the predictive coefficient memory 7 is simplified.

(2) Classification processing

Figure 3:
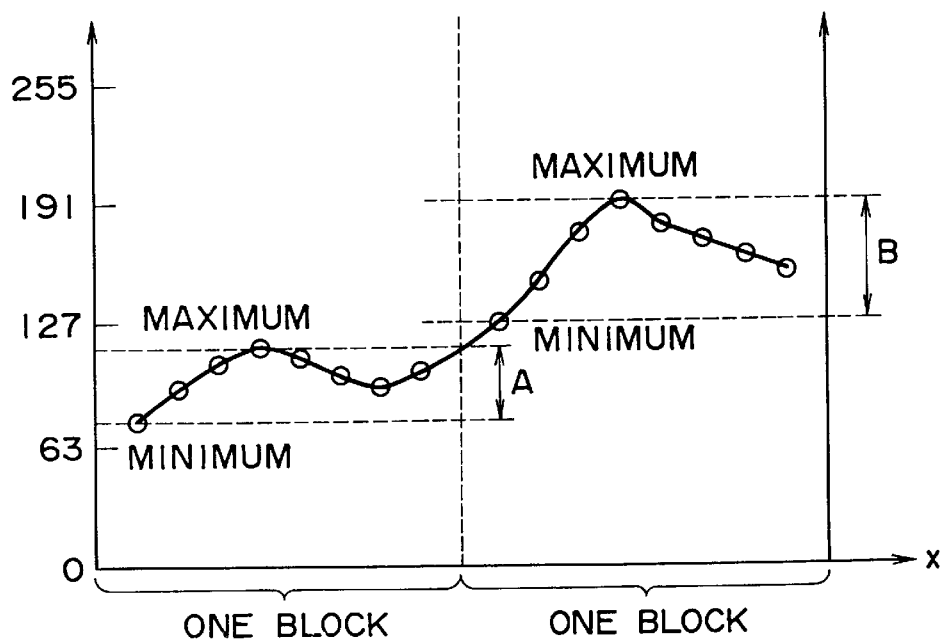
FIG. 3 is a graph for illustrating bit compression by the ADRC circuit.

In the next, the classification processing by the ADRC circuit 5 and class code generating circuit 6 is described. The ADRC circuit 5 defines the in-block dynamic range as the local feature of the image, and eliminates adaptively the redundancy mainly in level direction. For example as shown in FIG. 3, in a dynamic range from 0 to 255 of picture elements having 8 bit each, in-block dynamic ranges A and B required for requantization are significantly reduced for each block. Therefore, the requantization in such small dynamic ranges A and B allows the bit requirement to be reduced.

In detail, the ADRC circuit 5 divides evenly the difference between the maximum value MAX and the minimum value MIN in a block with a specified bit length, and requantize as shown in FIG. 4A according to the following equation,

DR=MAX−MIN+1

$$Q=[(x-\text{MIN}+0.5)\times 2^Q/\text{DR}] \quad (1)$$

wherein [z] represents a maximum integer of z or less. wherein DR represents in-block dynamic range, p represents bit assignment, x represents each picture element level in the block, and Q represents requantization code.

In this connection, FIG. 4A and FIG. 4B show the case of three bit requantization (namely p=3).

Then, the in-block picture elements in a data level corresponding to the highest gradation level ($2^p-1$) in FIG. 4A are averaged, and the average is assigned as the maximum value MAX' as shown in FIG. 4B. The in-block picture elements in a data level corresponding to the smallest gradation level 0 in FIG. 4A are averaged, and the average is assigned as the minimum value MIN' as shown in FIG. 4B.

Then, the in-block dynamic range DR' is redefined using the maximum value MAX' and the minimum value MIN' obtained as described above, and the requantization is carried out as described in FIG. 4B according the following equation based on the maximum value MAX' and the minimum value MIN' in the block obtained as described above,

DR'=MAX'−MIN'

$$q=[(x-\text{MIN}')\times(2^Q-1)/\text{DR}'+0.5] \quad (2)$$

wherein [z] represents a maximum integer of a or less. wherein q represents a requantization code.

By double requantization as described above, the ADRC circuit 5 reduces the adverse effect of noise, compresses efficiently the information content, and forms pattern compression data D6. The ADRC circuit 5 of the embodiment does not requantize with three bits but requantize with one bit or two bits depending on the flatness detection signal D4 as described hereinbefore.

The classification circuit 6 determines a class of the block, namely the class code c (D7) which represents the class of interpolation-addressed picture element by executing the following equation, $$c = \sum_{i=1}^{n} q_i (2^p)^{i-1} \quad (3)$$

wherein $q_l$ to $q_n$ represent requantized data obtained as the result of p-bit compression by the ADRC circuit 5.

(3) Forming of predictive coefficient memory

Figure 5:
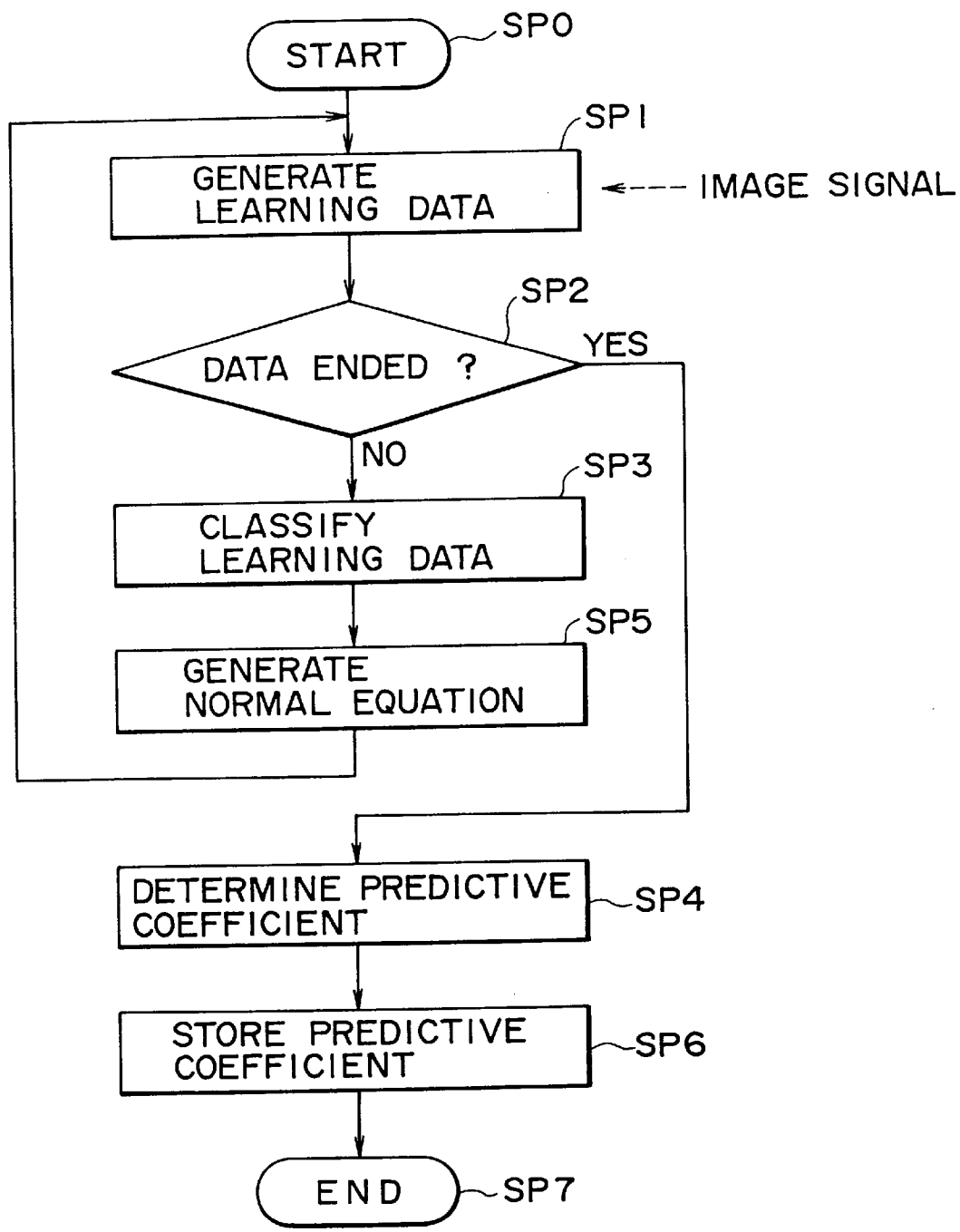
FIG. 5 is a flow chart for describing a procedure of predictive coefficients calculation processing by learning.
Figure 6:
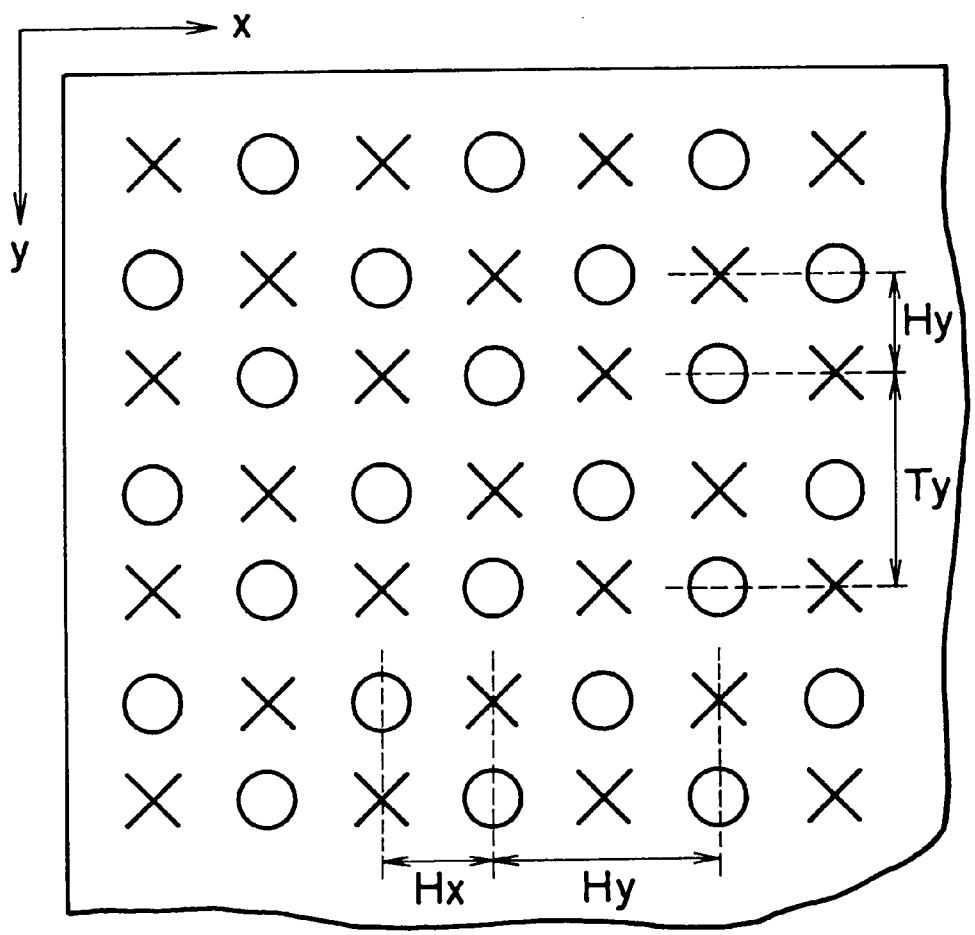
FIG. 6 is a schematic diagram for illustrating offset subsampling.
Figure 7:
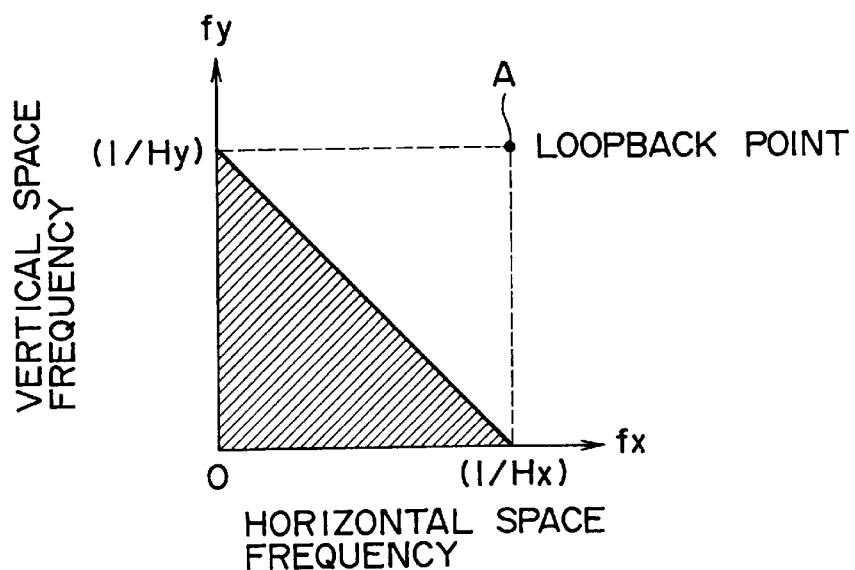
FIG. 7 is a schematic graph for describing a space frequency spectrum of transmissible band by two dimensional offset subsampling.
Figure 8:
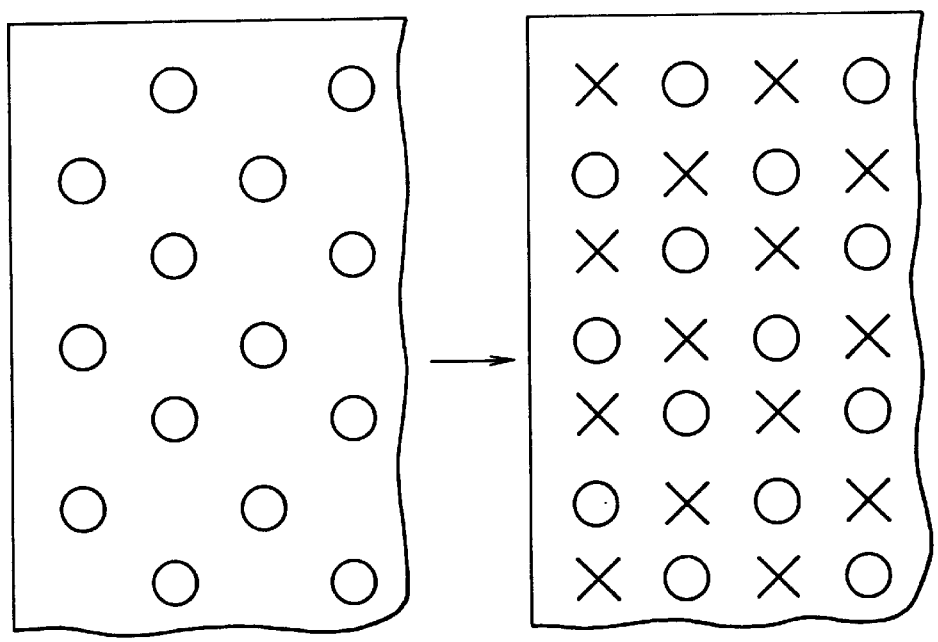
FIG. 8 is a schematic diagram for illustrating interpolation processing.

Then, a procedure for obtaining a predictive coefficient for being stored in the predictive coefficient memory 7 is described referring to FIG. 5. First, a learning data corresponding to a known image is formed to learn predictive coefficients in the step SP1. In detail, the sampling picture elements a to l and the picture element value before subsampling of the interpolating-addressed picture element (X symbol) in FIG. 2 are used as one set of learning data.

When a learning data is formed as described above, the use of a plurality of images instead of single image to form much learning data makes predictive coefficients more accurate.

In step SP2, whether necessary and sufficient learning data are formed or not is judged. If the predictive coefficient memory judges that more data are required additionally, the process proceeds to the step SP3, and if the learning data is judged to be sufficient, the process proceeds to the step SP4.

In the step SP3, the learning data are classified. When, the same classification as did in the image signal interpolating apparatus 1 is carried out. In detail, first the local flatness of the learning sampling data is detected, then picture elements used for classification are selected depending on the detection result, the selected picture elements are compressed by the ADRC coding, and a class code is formed, thus every learning data are classified.

Then normal equations are formed for each class based on classified learning data in the step SP5. Processing in the step SP5 is described in detail herein under. Herein for generalization, a case in which n sampling picture elements are involved as learning data is described. First, the relationship between picture element levels of each sampling picture element $x_1, \ldots, x_n$ and picture element levels before subsampling of addressed picture elements to be interpolated y is expressed by a linear predictive equation of n-tap using predictive coefficients $w_1, \ldots w_n$, for each class (c), $$y = w_1 x_1 + w_2 x_2 + \ldots + w_n x_n \quad (4)$$

The predictive coefficients $w_1, \ldots w_n$ in the equation (4) may be determined to solve the equation. Then, predictive coefficient values $w_1, \ldots, w_n$ which minimize the difference between the actual picture elements to be interpolated and resultant interpolated picture elements are determined. Herein because the learning is carried out for each class on a plurality of learning data, in the general case of m<n the predictive coefficient $w_1, \ldots, w_n$ can not be determined uniformly. An element of the error vector e is defined as the following equation, $$e_k = y_k - \{w_1 x_{k1} + w_2 x_{k2} + \ldots + w_n x_{k2}\}$$

$$(k=1,2, \ldots m) \quad (5)$$

wherein ek represents a prediction error for the learning data $x_{k1}, \ldots x_{kn}, y_k$ (k=1, 2, ..., m).

Then, predictive coefficients $w_1, \ldots$ wn which minimize the following equation 6 are determined.

$$e^2 = \sum_{k=1}^{m} \{e_k\}^2 \quad (6)$$

This determination is so called resolution method of least squares.

The partial differential coefficient of the equation 6 with respect to wi gives the equation 7.

$$\frac{\partial e^2}{\partial w_i} = \sum_{k=0}^{m} 2\left[\frac{\partial e_k}{\partial w_i}\right] e_k = \sum_{k=0}^{m} 2x_{ki} \cdot e_k \quad (7)$$

$$(i = 1, 2, \ldots, n)$$

$w_i$ which makes the equation 7 zero is determined for each w. For the determination of $w_i$, $X_{ij}$ and $Y_i$ are defined as in the following.

$$X_{ii} = \sum_{k=1}^{m} x_{ki} \cdot x_{ki} \quad (8)$$

$$Y_i = \sum_{k=1}^{m} x_{ki} \cdot y_k \quad (9)$$

Incorporating $X_{ij}$ and $Y_i$, the above mentioned equation 7 is rewritten to a normalized equation using matrices.

$$\begin{bmatrix} X_{11} & X_{12} & \ldots & X_{1n} \\ X_{21} & X_{12} & \ldots & X_{2n} \\ \ldots & \ldots & \ldots & \ldots \\ X_{n1} & X_{n2} & \ldots & X_{nn} \end{bmatrix} \begin{bmatrix} w_1 \\ w_2 \\ \ldots \\ w_n \end{bmatrix} = \begin{bmatrix} Y_1 \\ Y_2 \\ \ldots \\ Y_n \end{bmatrix} \quad (10)$$

The normalized equation 10 is simultaneous equations of n unknowns, therefore using the equation 10 all most probable values of unknowns $w_1, \ldots, w_n$ are determined. In this procedure for calculation of predictive coefficients in the step SP5, a loop of the step SP1-SP2-SP3-SP1 is repeated until a normalized equation for determination of unknown coefficients $w_1, \ldots, w_n$ is formed for each class.

After a while, a normalized equation represented by the equation 10 is formed for each class in the step SP5, and an affirmative result is obtained in the step SP2, then the process proceeds to the step SP4, and the normalized equation (10) is solved to determine predictive coefficients $w_1, \ldots, w_m$ for each class. In detail, the equation 10 is solved by Kolsky method because generally the matrix of left side member is positive constant-valued symmetric.

Then in the step SP6, the predictive coefficients $w_1, \ldots, w_n$ determined for each class are contained in addresses of the predictive coefficient memory corresponding to each class respectively, and in the following step SP7 the processing procedure for calculation of predictive coefficients is finished.

(4) Operation of the embodiment

In the structure described hereinbefore, the image signal interpolating apparatus 1 classifies picture elements to be interpolated depending on surrounding blocked data D6, wherein thinned out picture elements are the picture elements to be interpolated. When, the image signal interpolating apparatus 1 detects the flatness of picture elements a to d around an interpolation-addressed picture element prior to the classification, and selects surrounding picture elements used for classification depending on the significance of the flatness. As the result, the use of necessary minimum picture elements is enough for classification without loosing feature quantity of the image, unnecessary increase in the number of class is suppressed and thus the picture elements are classified efficiently.

Then, the image signal interpolating apparatus 1 forms pattern compression data D6 by compression of selected picture elements, and forms a class code D7 based on the pattern compression data D6. When, the image signal interpolating apparatus 1 changes the compression ratio depending on the value of flatness. As the result, the sufficient compression is carried out without loosing feature quantity of the image, this is another suppression of the unnecessary increase in the number of class.

Then, the image signal interpolating apparatus 1 reads the class code D7 and reads the predictive coefficients D8 stored in the predictive coefficient memory 7 as address. The predictive operating circuit 8 linearly combines predictive coefficients $w_1(c)$, to $w_{12}(c)$ which correspond to the class c and picture element data $x_1$ to $x_{12}$ of the sampling picture elements a to l included in the blocked data D3 as the following equation 11, and thereby the interpolation value y' which corresponds to each interpolation-addressed picture element is calculated, and the predictive operating circuit 8 gives it as interpolation data D2.

$$y' = w_1(c)X_1 + w_2(c)x_2 + \ldots + w_{12}(c)x_{12} \quad (11)$$

As described herein above, the image interpolating apparatus 1 can form interpolation data D2 which is almost the same as the picture element data contained in the original picture. The interpolation data D2 are synthesized with input image data D1 in a synthesizing circuit, which is not shown in the drawings, subsequently the synthesized data is fed to, for example, a television set or video tape recorder.

(5) The effect of the embodiment

The image interpolating apparatus 1 is structured as described hereinbefore, thereby, the local flatness of surrounding picture elements including an interpolation-addressed picture element is detected, the image interpolating apparatus 1 selects picture elements used for classification and changes the compression ratio for the classification depending on the resultant detected flatness, thus the interpolation-addressed picture element is classified correctly with the least number of class. By applying this technique, the image signal interpolating apparatus 1 which can form interpolation data near the real value with a simple structure is realized.

(6) Other embodiments

In the embodiment described above, a case of classification, in which the flatness is detected using four picture elements a to d near a picture element to be interpolated, and the four picture elements a to d are used for classification when the resultant flatness is small, on the other hand, when the resultant flatness is large, the average value M of the four picture elements a to d and additional surrounding picture elements e to l which distribute in a wider area are used for classification, is described. However, the number of picture element used for flatness detection and the number of picture element selected depending on the resultant detected flatness are not limited to the above mentioned number, and in conclusion, the flatness, is detected using picture elements near a picture element to be interpolated, then, when the resultant detected flatness is large, the classification may be carried out using more picture elements than used when the resultant detected flatness is small.

In the embodiment described hereinbefore, the number of picture element used for classification is changed and also the compression ratio of the ADRC circuit 5 is changed. However, only the number of picture element used for classification may be changed. When the compression ratio is changed, the switching is not limited to one bit and two bit.

In the embodiment described hereinbefore, a case, in which the classification is carried out by bit-compressing selected picture element data D5 selected by the image selecting circuit 4 using the ADRC circuit 5 and by the class code generating circuit 6, is described, however various compression means, for example, discrete cosine transform (DCT), differential quantization (DPCM), sub-band coding, and wavelet transform, may be used. The method for classification is not limited to the bit-compression, for example, a method for classification in which the direction having close correlation to surrounding picture elements of an interpolation-addressed picture element is detected and classification is carried out based on the resultant detection may be used.

In the embodiment described hereinbefore, a case, in which predictive coefficients for each class are determined by learning of the method of least squares, is described, however, the determination of predictive coefficients is not limited to this method, and various learning methods may be used.

In the embodiment describe hereinbefore, a case, in which the predictive coefficient memory 7 and predictive operating circuit 8 are provided, the predictive coefficient D8 stored previously in the predictive coefficient memory 7 through learning is read out corresponding to the class code D7, the read-out predictive coefficient D8 and blocked data D3 are linearly combined to determine the interpolation data, is described, however, the present invention is not limited to this case, but the interpolation data may be determined by the method in which a memory for containing the representative for each class previously obtained by learning is provided instead of the predictive coefficient memory 7 and predictive operating circuit 8, the representative which corresponds to each class is read out, and the read-out representative is used as the interpolation data.

In this case, the first method for obtaining the representative to be contained in the memory is a learning through weighted averaging. In detail, real picture element values which corresponds to each picture element respectively are accumulated for each class, the resultant accumulated value is divided by the number of picture element value involved in the accumulation, and such processing is applied to various images to obtain representatives for each class.

The second method for obtaining the representative is a learning through normalization. In detail, a block comprising a plurality of picture elements including an interpolation-addressed picture element is formed, a value which is obtained by subtracting the standard value of the block from the real picture element value which corresponds to the interpolation-addressed picture element is normalized by the dynamic range in the block, the normalized values are accumulated, and the accumulated value is divided by the cumulative frequency, such processing is applied to various images to obtain the representative for each class.

As described hereinbefore according to the present invention, the image signal interpolating apparatus is provided with flatness detecting means for detecting the flatness near an interpolation-addressed picture element using picture elements near the picture element to be interpolated, picture element selecting means for selecting surrounding picture elements corresponding to the resultant detected flatness from surrounding picture elements around the picture element to be interpolated, classification means for classifying the interpolation-addressed picture element using selected picture elements, predictive coefficient generating means for generating predictive coefficients corresponding to the classified class, and interpolation data calculating means for calculating interpolation data which corresponds to each interpolation-addressed picture element by execution of interpolation operation using the predictive coefficient and transmission image data, thereby, the interpolation picture element value near the real value is obtained without aliasing noise.

According to the present invention, picture elements used for classification are selected depending on the resultant detected flatness, thereby, an interpolation-addressed picture element is classified correctly with the least number of class, and the least number of class allows the structure to be simple.

What is claimed is:

1. An apparatus for converting a first image signal having a first resolution into a second image signal having a second resolution greater than the first resolution by producing pixels of the second image signal in accordance with pixels of the first image signal, said apparatus comprising:

means for detecting an amount of a characteristic near a picture element of the second image signal to be produced using picture elements of the first image signal near the picture element to be produced;

means for selecting surrounding picture elements corresponding to the detected amount of the characteristic, the surrounding picture elements of the first image signal being adjacent to the picture element of the second image signal to be produced;

means for determining a class corresponding to the picture element to be produced in accordance with the selected surrounding picture elements;

memory having stored therein predicted data for each of a plurality of classes, the predicted data being retrieved from the memory in response to the determined class;

means for producing the picture element of the second image signal to be produced in accordance with the predicted data and wherein predictive data for each of a plurality of classes is produced by comprising the steps of:

detecting an amount of a characteristic near a picture element to be targeted of the second reference image signal having the second resolution using picture elements of the first reference image signal having the first image signal near a picture element to be targeted, the picture element to be targeted corresponding to a picture element to be produced;

selecting surrounding picture elements corresponding to the detected amount of the characteristic, the surrounding picture elements of the first reference image signal being adjacent to the picture element to be targeted of the second reference image signal;

determining a class corresponding to the picture element to be targeted of the second reference image signal in accordance with the selected surrounding picture elements of the first reference image signal;

determining predicted data for each class by using the first reference image signal and the second reference image signal; and for storing the determined predictive data in the memory.

2. An apparatus for converting a first image signal having a first resolution into a second image signal having a second resolution greater than the first resolution by producing pixels of the second image signal in accordance with pixels of the first image signal, said apparatus comprising;

means for detecting an amount of a characteristic near a picture element of the second image signal to be produced using picture elements of the first image signal near the picture element to be produced;

means for selecting surrounding picture elements corresponding to the detected amount of the characteristic, the surrounding picture elements of the first image signal being adjacent to the picture element of the second image signal to be produced;

means for determining a class corresponding to the picture element to be produced in accordance with the selected surrounding picture elements;

memory having stored therein a set of predicted coefficients for each of a plurality of classes, the set of predicted coefficients being retrieved from the memory in response to the determined class;

means for producing the picture element of the second image signal to be produced in accordance with the set of predicted coefficients;

wherein predictive coefficients for each of a plurality of classes is produced by comprising the steps of:

detecting an amount of a characteristic near a picture element to be targeted of the second reference image signal having the second resolution using picture elements of the first reference image signal having the first image signal near a picture element to be targeted, the picture element to be targeted corresponding to a picture element to be produced;

selecting surrounding picture elements corresponding to the detected amount of the characteristic, the surrounding picture elements of the first reference image signal being adjacent to the picture element of the second reference image signal to be produced;

determining a class corresponding to the picture element of the second reference image signal to be produced in accordance with the selected surrounding picture elements of the first reference image signal;

determining the set of predicted coefficients for each class by using the first reference image signal and the second reference image signal; and storing the determined set of predicted coefficients for each class in the memory.

3. An apparatus for converting a first image signal into a second image signal having a greater resolution than the first digital signal by producing pixels of the second image signal in accordance with the first image signal, said apparatus comprising:

means for detecting an amount of a characteristic near a picture element of the second image signal to be produced using picture elements of the first image signal near the picture element to be produced;

means for selecting surrounding picture elements corresponding to the detected amount of the characteristic, the surrounding picture elements of the first image signal being adjacent to the picture element of the second image signal to be produced;

means for determining a class corresponding to the picture element to be produced in accordance with the selected surrounding picture elements;

memory having stored therein a representative value for each of plurality of classes, the representative value being retrieved from the memory in response to the determined class;

means for producing the picture element of the second image signal to be produced in accordance with the representative value and wherein representative value for each of a plurality of classes is produced by comprising the steps of:

detecting an amount of a characteristic near a picture element to be targeted of the second image signal having the second resolution using picture elements of the first reference image signal having the first image signal near a picture element to be targeted, the picture element to be targeted corresponding to a picture element to be produced;

selecting surrounding picture elements corresponding to the detected amount of the characteristic, the surrounding picture elements of the first reference image signal being adjacent to the picture element of the second reference image signal to be produced;

determining a class corresponding to the picture element of the second reference image signal to be produced in accordance with the selected surrounding picture elements of the first reference image signal;

determining representative value for each class by using the first reference image signal and the second reference image signal; and storing the determined representative value for each class in the memory.

4. A method for converting a first image signal having a first resolution into a second image signal having a second resolution greater than the first resolution by producing pixels of the second image signal in accordance with pixels of the first image signal, said method comprising the steps of:

detecting an amount of a characteristic near a picture element of the second image signal to be produced using picture elements of the first image signal near the picture element to be produced;

selecting surrounding picture elements corresponding to the detected amount of the characteristic, the surrounding picture elements of the first image signal being adjacent to the picture element of the second image signal to be produced;

determining a class corresponding to the picture element to be produced in accordance with the selected surrounding picture elements;

generating predicted data from the determined class and a reference image signal having the second resolution by retrieving the predicted data from a memory in response to the determined class, the memory having stored therein predicted data for each of a plurality of classes;

producing the picture element of the second image signal to be produced in accordance with the predicted data;

wherein the predictive data for each of a plurality of classes is produced by learning method comprising steps of:

detecting an amount of a characteristic near a picture element to be targeted of the second reference image signal having the second resolution using picture elements of the first reference image signal having the first image signal near a picture element to be targeted, the picture element to be targeted corresponding to a picture element to be produced;

selecting surrounding picture elements corresponding to the detected amount of the characteristic, the surrounding picture elements of the first reference image signal being adjacent to the picture element to be targeted of the second reference image signal;

determining a class corresponding to the picture element to be targeted of the second reference image signal in accordance with the selected surrounding picture elements of the first reference image signal; and determining predicted data for each class by using the first reference image signal and the second reference image signal.

5. A method for converting a first image signal having a first resolution into a second image signal having a second resolution greater than the first resolution by producing pixels of the second image signal in accordance with pixels of the first image signal, said method comprising the steps of:

detecting an amount of a characteristic near a picture element of the second image signal to be produced using picture elements of the first image signal near the picture element to be produced;

selecting surrounding picture elements corresponding to the detected amount of the characteristic, the surrounding picture elements of the first image signal being adjacent to the picture element of the second image signal to be produced;

determining a class corresponding to the picture element to be produced in accordance with the selected surrounding picture elements;

generating a set of predicted coefficients from the determined class and a reference image signal having the second resolution by retrieving the set of predicted coefficients from a memory in response to the determined class, the memory having stored therein a set of predicted coefficients for each of a plurality of classes;

producing the picture element of the second image signal to be produced in accordance with the set of a predicted coefficients;

wherein the predictive data for each of a plurality is produced by learning method comprising steps of:

detecting an amount of a characteristic near a picture element to be targeted of the second reference image signal having the second resolution using picture elements of the first reference image signal having the first image signal near a picture element to be targeted, the picture element to be targeted corresponding to a picture element to be produced;

selecting surrounding picture elements corresponding to the detected amount of the characteristic, the surrounding picture elements of the first reference image signal being adjacent to the picture element of the second reference image signal to be produced;

determining a class corresponding to the picture element of the second reference image signal to be produced in accordance with the selected surrounding picture elements of the first reference image signal; and determining the set of predicted coefficients for each class by using the first reference image signal and the second reference image signal.

6. A method for converting a first image signal into a second image signal having a resolution greater than a resolution of the first image signal by producing pixels of the second image signal in accordance with the first image signal, said method comprising steps of:

detecting an amount of a characteristic near a picture element of the second image signal to be produced using picture elements of the first image signal near the picture element to be produced;

selecting surrounding picture elements corresponding to the detected amount of the characteristic, the surrounding picture elements of the first image signal being adjacent to the picture element of the second image signal to be produced;

determining a class corresponding to the picture element to be produced in accordance with the selected surrounding picture elements;

generating a representative value from the determined class and a reference signal having the second resolution by retrieving the representative value from a memory in response to the determined class, the memory having stored therein the representative value for each of plurality of classes;

producing the picture element of the second image signal to be produced in accordance with the representative value;

wherein the predictive data for each of a plurality of classes is produced by learning method comprising steps of:

detecting an amount of a characteristic near a picture element to be targeted of the second reference image signal having the second resolution using picture elements of the first reference image signal having the first image signal near a picture element to be targeted, the picture element to be targeted corresponding to a picture element to be produced;

selecting surrounding picture elements corresponding to the detected amount of the characteristic, the surrounding picture elements of the first reference image signal being adjacent to the picture element of the second reference image signal to be produced;

determining a class corresponding to the picture element of the second reference image signal to be produced in accordance with the selected surrounding picture elements of the first reference image signal; and determining representative value for each class by using the first reference image signal and the second reference image signal.

* * * * *